United States Patent
Kanojiya et al.

(10) Patent No.: US 12,461,979 B2
(45) Date of Patent: Nov. 4, 2025

(54) ENHANCED AND ADAPTIVE QUERY DETECTION ENGINE(S) FOR PREDICTING AND IDENTIFYING EMERGENT INCIDENT QUERIES

(71) Applicant: Oracle International Corporation, Redwood City, CA (US)

(72) Inventors: Mayur Kamalkumar Kanojiya, Ahmedabad (IN); Naveen Thulasidharan, Trivandrum (IN); Nithin Nassar, Thiruvananthapuram (IN)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/591,964

(22) Filed: Feb. 29, 2024

(65) Prior Publication Data
US 2025/0278444 A1    Sep. 4, 2025

(51) Int. Cl.
    *G06F 16/9535*     (2019.01)
    *G06F 16/906*     (2019.01)

(52) U.S. Cl.
    CPC ........ *G06F 16/9535* (2019.01); *G06F 16/906* (2019.01)

(58) Field of Classification Search
    CPC ............................ G06F 16/9535; G06F 16/906
    See application file for complete search history.

(56) References Cited

U.S. PATENT DOCUMENTS

| | | | |
|---|---|---|---|
| 8,145,677 B2 * | 3/2012 | Al-Shameri | G06F 16/2465 707/802 |
| 8,150,841 B2 * | 4/2012 | Meyers | G06F 16/24534 707/722 |
| 8,676,802 B2 | 3/2014 | Zelevinsky et al. | |
| 10,387,410 B2 * | 8/2019 | Suleman | G06F 3/167 |
| 11,075,951 B1 * | 7/2021 | Kats | H04L 63/20 |
| 11,914,590 B1 * | 2/2024 | Plenderleith | G06F 16/24552 |

(Continued)

FOREIGN PATENT DOCUMENTS

WO    2008067554 A3    12/2008

OTHER PUBLICATIONS

Amazon, "Amazon Comprehend: Developer Guide," Copyright 2024 Amazon Web Services, Inc. (556 pages).

(Continued)

*Primary Examiner* — Debbie M Le

(57) ABSTRACT

Various embodiments of the present technology generally relate to systems and methods for providing a query detection engine and its related functions. In an example, a method includes receiving, by a query detection engine, a plurality of queries and processing the queries to generate processed queries. For each of the processed queries, the query detection engine, generates an embedding and then groups the embeddings into clusters such that each cluster contains a subset of processed queries. The query detection engine then generates a cluster topic for each of the clusters. Once a new query is received, the query detection engine maps the new query to an appropriate cluster and generates a confidence score for the mapping of the new query to the appropriate cluster. Based on the confidence score, the query detection engine determines that the new query is an emergent query and generates an alert of the emergent query.

20 Claims, 11 Drawing Sheets

(56) References Cited

U.S. PATENT DOCUMENTS

| | | | |
|---|---|---|---|
| 12,013,853 B2* | 6/2024 | Patel | G06F 16/21 |
| 12,079,185 B2* | 9/2024 | Misiewicz | G06F 16/3347 |
| 2018/0032522 A1* | 2/2018 | Singhal | G06F 16/24578 |
| 2023/0153310 A1* | 5/2023 | Yun | G06F 16/24578 707/727 |
| 2024/0371481 A1* | 11/2024 | Bhatt | G16H 50/20 |
| 2025/0005072 A1* | 1/2025 | Salowitz | G06F 16/9035 |

OTHER PUBLICATIONS

Oracle Fusion Service Information Development Team, "Oracle Fusion Service: Using Service Center in the Redwood User Experience," 2022, (82 pages).

Oracle, "Oracle B2C Service Platform: The foundation and capabilities for a best-in-class customer experience," Nov. 1, 2020, Version 1.01 (19 pages).

* cited by examiner

ENHANCED AND ADAPTIVE QUERY DETECTION ENGINE(S) FOR PREDICTING AND IDENTIFYING EMERGENT INCIDENT QUERIES

TECHNICAL FIELD

Various embodiments of the present technology generally relate to cloud service-based customer service platforms. More specifically, embodiments of the present technology relate to systems and methods for providing an emergent query detection engine for predicting and identifying emergent incident queries received via a cloud service-based customer service platform.

BACKGROUND

Cloud service-based customer services have revolutionized the way businesses interact with their customers, offering a seamless and scalable approach to customer support. Leveraging the power of cloud computing, organizations can provide efficient and responsive services by storing and accessing customer data securely in the cloud. This enables real-time collaboration among support teams, ensuring a consistent and personalized customer experience across various channels. Cloud-based customer service platforms also facilitate easy integration with other business applications, enhancing the overall efficiency of customer interactions. With the flexibility and accessibility offered by cloud services, businesses can adapt quickly to changing customer needs, scale their support infrastructure effortlessly, and deliver a superior level of service in an era where agility and responsiveness are paramount.

While cloud-based customer services offer numerous advantages, they are not without challenges, particularly in identifying and addressing emerging customer issues. One common issue stems from the complexity of managing vast amounts of data stored across various cloud platforms. Sometimes, disparate data sources may hinder the seamless integration needed for a holistic view of customer interactions. Additionally, concerns related to data privacy and security can pose challenges in accurately identifying customers and their requests. As businesses rely on third-party cloud service providers, they may encounter interoperability issues or service disruptions, leading to delays in addressing customer needs. Furthermore, the reliance on automated systems, such as chatbots, can result in misinterpretation of customer queries, causing frustration and dissatisfaction. Striking a balance between automation and human intervention remains a crucial aspect in overcoming these challenges, ensuring that cloud-based customer services can effectively identify and address customer requests while maintaining a high standard of service.

Accordingly, there exists a need for improved enhanced and adaptive query detection engine(s) as provided herein that provide insights and actionable intelligence to predict and identify emergent incident queries.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing a query detection engine for identifying and predicting emergent incident queries ("emergent queries"). The query detection engine may receive numerous queries over time. The query detection engine retrieves a portion of those queries based on a selected time period. Once retrieved, the queries selected by the query detection engine may be processed by one or more preprocesses to remove extraneous content and modify the textual content of the query into a desired form. Once the queries are processed, embeddings based on these processed queries are then generated. That is, an embedding for each processed query may be generated by the query detection engine. Once the embeddings are generated, the query detection engine may group the embeddings into clusters such that each cluster contains embeddings associated with a subset of the processed queries. After the processed queries, via their respective embeddings, are clustered, the query detection engine may generate a cluster topic for each of the clusters.

When the query detection engine receives a new query, the new query may be processed, and a respective embedding may be generated for the new query. The new query may then be mapped to the existing clusters that were generated by the query detection engine. Based on the mapping of the new query to the existing clusters, the query detection engine may generate a confidence score. If the confidence score is above a confidence threshold, the query detection engine may determine whether the new query relates to the existing clusters, thereby relating to existing cluster topics. However, if the query detection engine determines that the confidence score for the new query is below the confidence threshold, then the query detection engine may determine the new query to be an emergent query. An emergent query may indicate that the new query relates to an emergent cluster topic, thereby indicating that there is an emerging or new ongoing incident. In some cases, the query detection engine may generate an alert of the emergent query to notify respective personnel of the emergent issue.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
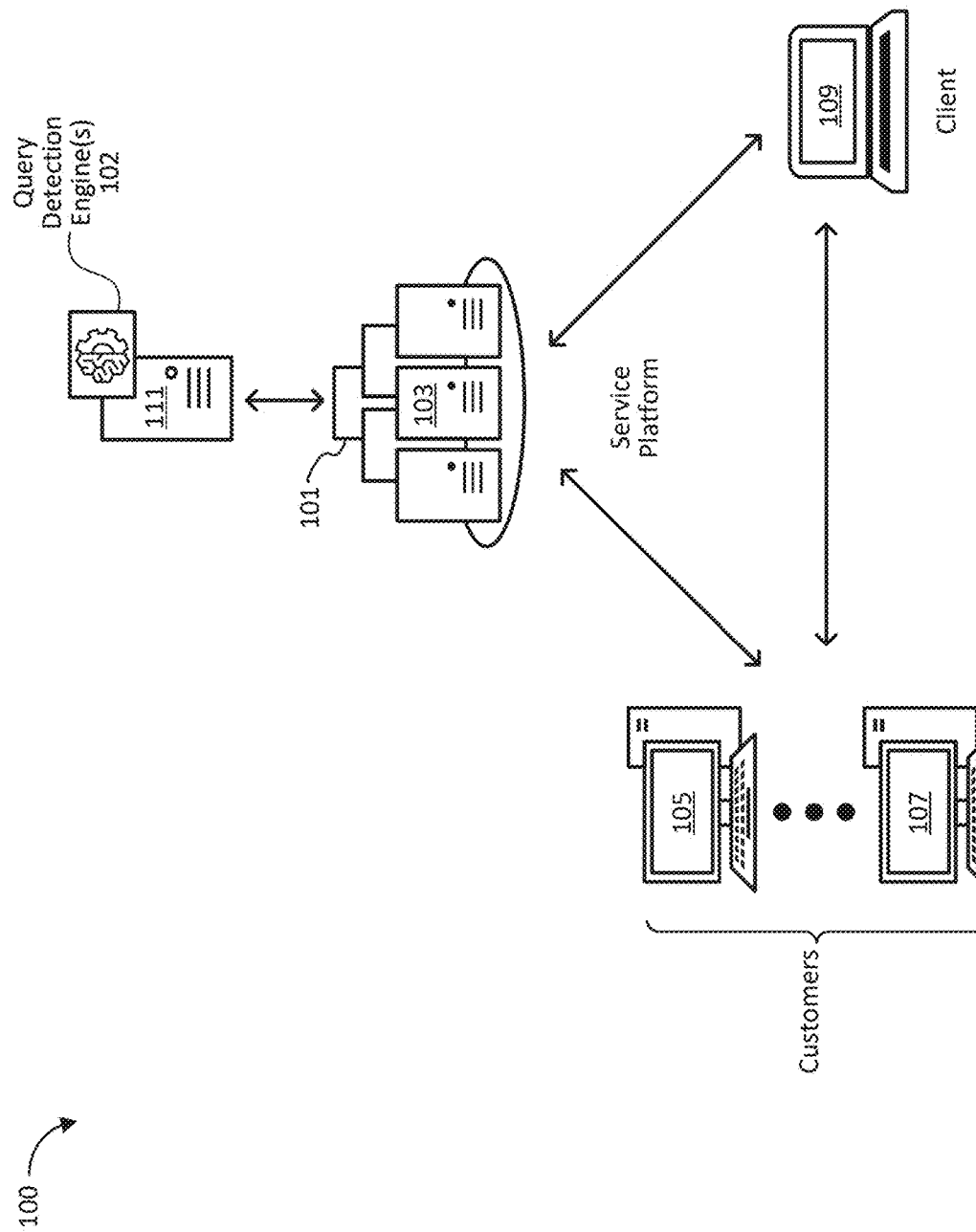
FIG. 1 illustrates an example operational environment for a system for providing one or more features of a query detection engine, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Cloud service-based customer services play a pivotal role within businesses and organizations, serving as a linchpin for streamlined and agile customer interactions. By harnessing the power of cloud computing, organizations can centralize customer data, enabling a cohesive and real-time view of customer interactions across various touchpoints. This fosters a more personalized and responsive approach to customer service. Cloud-based solutions also facilitate scalability, allowing businesses to effortlessly adapt their customer service infrastructure to meet fluctuating demands. The accessibility and flexibility of cloud services enhance collaboration among support teams, ensuring a consistent and efficient customer experience. Moreover, these services enable organizations to integrate cutting-edge technologies like artificial intelligence and machine learning, providing predictive analytics and automation to enhance problem resolution and decision-making processes. Overall, cloud service-based customer services empower businesses to stay competitive in a rapidly evolving digital landscape, fostering customer satisfaction and loyalty.

Traditional cloud service-based customer services, however, encounter challenges when it comes to identifying and promptly handling trending or emergent incident queries from customers. One primary issue revolves around the sheer volume and complexity of data stored across multiple cloud platforms. The decentralized nature of this data can hinder the rapid identification of critical incidents, making it challenging for customer support teams to prioritize and address urgent matters effectively. Moreover, the reliance on automated systems may lead to misunderstandings or misinterpretations of incident-related queries, potentially exacerbating the problem. In times of widespread disruptions, such as server outages or security breaches, the influx of incident queries can overwhelm cloud-based customer service systems, causing delays and impacting customer satisfaction.

The challenge of resource allocation by service agents is particularly pronounced in traditional cloud service-based customer services when it comes to identifying and addressing emergent incident queries. Service agents often face difficulties in efficiently assigning resources to swiftly respond to critical incidents due to the dynamic and unpredictable nature of emergent situations. Traditional approaches may involve manual intervention in the assignment process, leading to delays and potential oversight of urgent matters. Additionally, the lack of real-time insights into the severity and impact of incidents can hinder effective resource allocation.

To address the above shortcomings, example query detection engine(s) are provided herein. The enhanced and adaptive query detection engines provided herein predict and identify emergent queries based on historical and current query trends. By predicting and identifying emergent queries as they begin to trend, the query detection engines allow service agents to optimize their efforts, allocate resources judicially, and ensure a rapid and targeted resolution of emergent incidents. As can be appreciated, rapid response times and effective responses to emergent queries elevate the overall effectiveness of cloud service-based customer services in handling critical situations and improve the overall customer experience. Moreover, prediction and identification of emergent queries allows for swift recognition and response to critical issues.

To predict and identify emergent queries, the query detection engines provided herein may include multiple query engines, such as a global query engine and an unidentified query engine. The query detection engine may gather historical queries that include past incident queries over a selected time period, such as a past week, a past month, a past year, or in some cases all incident queries corresponding to a given client or subject matter. Upon gathering or determining the historical queries, the query detection engine may cluster the historical queries into one or more clusters based on the textual content included in each historical query. That is, the historical queries may be clustered based on how related the textual content within each query is to other queries within the historical queries.

Once the historical queries are clustered into multiple clusters, a cluster topic or topic for each cluster is generated by the query detection engine. For example, a subset of the historical queries relates to refund requests, then the incident queries within that subset may be grouped into a single cluster. Then a cluster topic may be generated for that cluster that identifies the grouped incident queries as Refund Requests.

When a new incident query is received, the query detection engine may map the new incident query to the cluster. Depending on how close the new incident query is mapped to an existing cluster, the query detection engine may determine whether or not the new incident query relates to the existing query groups. For example, if the new incident query relates to a refund request, then the query detection engine may map the new incident query to the Refund Request cluster and the mapping of the new incident query may indicate the relational similarity between the incident query and the Refund Request cluster. However, if the new incident query relates to a lost gift card, then mapping of the new incident query may indicate that that there is minimal relational similarity between the new incident query and the Refund Request cluster.

If the new incident query is determined to not be related to any of the current clusters, then the detection engine may assign the new incident query to an unidentified query group. When the unidentified query group reaches a threshold number of unidentified queries, then the query detection engine may cluster the unidentified queries based on the textual content of each unidentified query and determine a cluster topic for each of these clusters. By following the clustering of the unidentified queries, the query detection engine can identify cluster topics as they begin to rise or trend. Once a cluster of the unidentified queries reaches a threshold amount, the query detection engine may identify the corresponding cluster topic as an emergent query. In some cases, the query detection engine may generate an alert for the emergent query to bring attention to the trending and rising cluster topic for service agents.

As can be appreciated, the query detection engine's ability to provide rapid and appropriate responses to customer incident queries not only enhances customer satisfaction but also improves business resources and flow. By addressing incidents promptly, businesses can reduce the strain on technical resources and support teams. Timely responses streamline the resolution process, minimizing the need for extensive troubleshooting and resource-intensive investigations. This efficiency not only leads to faster problem resolution but also optimizes the allocation of technical resources, reducing the overall workload on support systems. Additionally, proactive incident management can prevent issues from escalating, mitigating the potential for widespread technical disruptions and subsequently lowering the impact on business operations. In a technical landscape where responsiveness is crucial, the ability to rapidly and appropriately address emergent queries not only elevates customer satisfaction but also contributes to a more resource-efficient and resilient technical infrastructure.

Turning now to the Figures, FIG. 1 illustrates an example operational environment for a system 100 for providing one or more features of a query detection engine, according to an embodiment herein. The example system 100 includes a service platform 101. The service platform 101 employs one or more server computers 103 co-located with respect to each other or distributed across one or more data centers. Example servers include web servers, application servers, virtual or physical servers, or any combination or variation thereof, of which computing system 1201 in FIG. 12 is broadly representative.

The service platform 101 is a cloud-based service platform that aids organizations or clients in assisting their customers with customer service needs. For example, the service platform 101 may provide a suite of features that allow organizations to connect with their customers through the customer's channel of choice, such as an Oracle B2C Service Platform®. As those skilled in the art appreciate, the service platform 101 plays a pivotal role in connecting customers, here represented by client devices 105 and 107, to clients or organizations, here represented by a client device 109. By utilizing the power of cloud computing, the service platform 101 enables customers via client devices 105 and 107 to initiate and manage service interactions through various channels, such as online portals, mobile apps, and social media. By centralizing customer data and communication channels, the service platform 101 allows organizations or clients to offer a unified and consistent experience across touchpoints. That is, customers via the client devices 105 and 107 can log-in, submit requests or incident queries, and access relevant information corresponding to the organization associated with the client device 109 via the service platform 101.

The service platform 101 also facilitates real-time collaboration between customers, via the client devices 105 and 107, and service agents. In the illustrated example, the client device 109 may correspond to a service agent who represents a business or organization whose services the customers associated with the client devices 105 and 107 are accessing. The service platform 101 provides the service agent associated with the client device 109 with a comprehensive view of customer interactions, allowing the service agent to provide personalized and informed assistance to the client devices 105 and 107. For example, the service agent associated with the client device 109 may assist the customers associated with the client devices 105 and 107 with incident requests or queries. That is, when the client device 105 submits an incident query, such as a request for a refund or assistance with an issue, the service platform 101 connects the service agent via the client device 109 with the customer to aid in addressing the customer's query.

As can be appreciated, the client devices 105, 107, and 109 communicate with the service platform 101 via one or more internets and intranets, the Internet, wired and wireless networks, local area networks (LANs), wide area networks (WANs), or any other type of network or combination thereof. Examples of the client devices 105, 107, and 109 may include personal computers, tablet computers, mobile phones, gaming consoles, wearable devices, Internet of Things (IoT) devices, and any other suitable devices, of which computing system 1201 in FIG. 12 is also broadly representative.

To aid the service agent associated with the client device 109 with his or her role in addressing incident queries submitted by the client devices 105 and 107, the service platform 101 includes a query detection engine 102. The query detection engine 102 predicts and identifies emergent queries as they are received by the service platform 101 from customers, such as from the client devices 105 and 107. As noted above, the service platform 101 may provide one or more customer service functions to aid an organization or client, such as the client device 105. In such a scenario, the service platform 101 may receive one or more incident queries from customers, such as the client device 109 and the client device 105 in responding to the received incident query.

To provide these functions, the query detection engine 102 may employ one or more server computers 111 co-located with respect to each other or distributed across one or more data centers, of which computing system 1201 in FIG. 12 is broadly representative. In some embodiments, the query detection engine 102 hosts one or more content generators on the server computers 111 as well. In other embodiments, the query detection engine 102 and/or various components of the query detection engine 102, such as a content generator, may be hosted separately from the service platform 101, such as by a third party. Various configurations are described in greater detail below.

Although the illustrated system 100 only includes client devices 105 and 107 representing corresponding customers, it should be appreciated that in a real-world scenario hundreds if not thousands of customers may interact with the service platform 101. Similarly, while a single client device 109 is illustrated to represent a corresponding service agent, in a real-world scenario there may be hundreds if not thousands of service agents who interact with the customers via the service platform 101 to provide services from an associated business.

One service that the service agents, such as the service agent associated with the client device 109, provide to customers via the service platform 101 is assistance with incident queries (hereinafter "queries.") Queries may be requests for assistance with issues surrounding goods and services provided by the business that employs the service agent associated with the client device 109. As such, the service agent's role is to identify and respond to the queries submitted by the customers associated with the client devices 105 and 107. As can be appreciated, the service agent associated with the client device 109 may receive hundreds of queries from customers on a daily basis. Being able to identify and understand how to direct his or her resources appropriately to address each of these queries swiftly and accurately is critical to providing an enhanced customer service experience.

To provide an enhanced customer service experience, the query detection engine 102 may gather and monitor the queries as they are received from the client devices 105 and 107 over time. Once gathered, the query detection engine 102 generates clusters of the queries from the customers to identify trends in cluster topics and predict rising cluster topics based on recently received queries. As can be appreciated, the ability to identify and predict cluster topics allows the service agent associated with the client device 109 to efficiently allocate resources and provide adequate recourse for new and arising incident issues.

Figure 2:
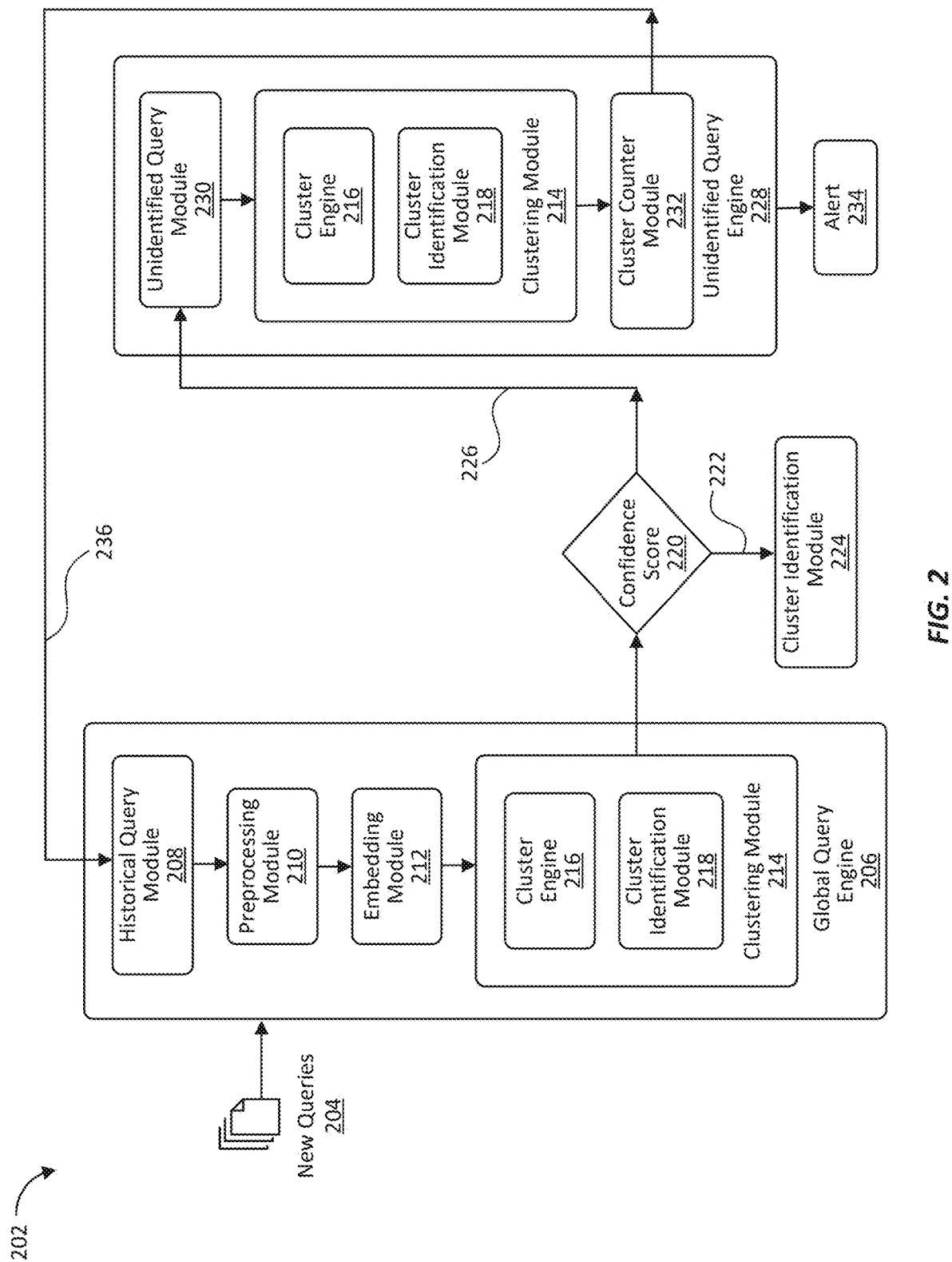
FIG. 2 illustrates an example query detection engine, according to an embodiment herein.

Referring now to FIG. 2, an example query detection engine 202 is illustrated, according to an embodiment herein. The query detection engine 202 may be the same or similar to the query detection engine 102. For example, the query detection engine 202 may be part of a service platform, such as the service platform 101, such to aid service agents in assisting customers with queries regarding issues that customer experience.

Figure 3:
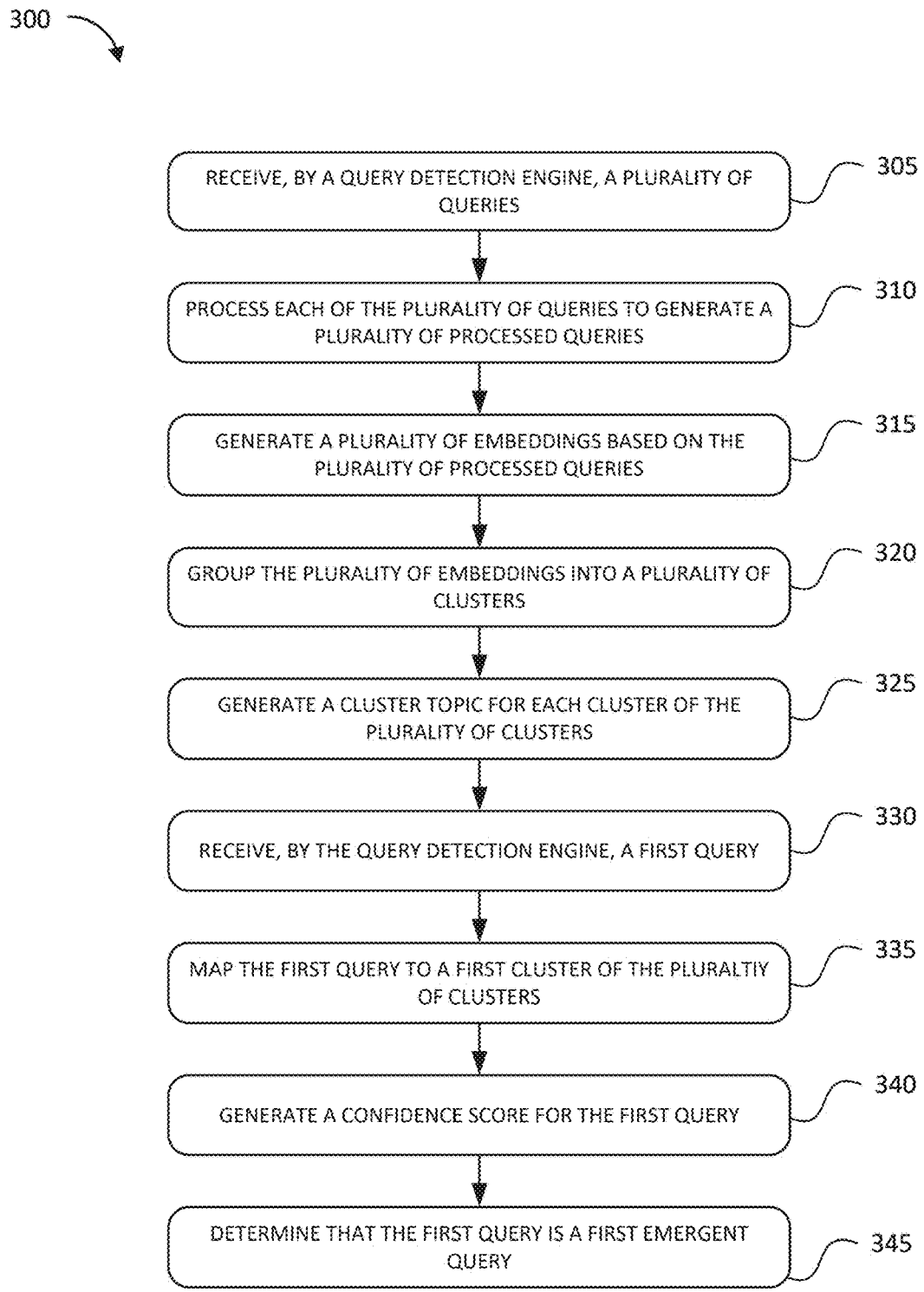
FIG. 3 illustrates an example emergent query detection process, according to an embodiment herein.

For ease of explanation, FIG. 2 is described in conjunction with FIG. 3. FIG. 3 provides an example emergent query detection process, in particular, a process 300 for providing the query detection engine 202 and one or more of its functions, according to an embodiment herein. Although FIG. 3 is described with reference to FIG. 2, it should be appreciated that any steps of the process 300 may be used with components and elements from any of the other figures described herein.

As illustrated, the query detection engine 202 may include a global query engine 206 and an unidentified query engine 228. In this manner, the query detection engine 202 may include two separate pipelines or flows for identifying and predicting emergent incident queries (hereinafter "emergent queries"). As will be described in detail below, the global query engine 206 may identify cluster topics based on queries received from customers, referred herein as historical queries. New or recently received queries are then mapped to the identified cluster topics. If a new query does not accurately map to an existing cluster topic, then the unidentified query engine 228 monitors and predicts a trending or rising cluster topic that the new query may be part of.

Starting with the global query engine 206, the query detection engine 202 receives multiple queries from customers via the service platform 101 (305). Queries received from customers may be received or stored in a historical query module 208. As those skilled in the art may readily appreciate, in some cases, the historical query module 208 may store the queries received from customers, while in other cases, the historical query module 208 may retrieve queries received from customers based on a selected time period. For example, the historical query module 208 may retrieve queries received from customers over the past week, past month, or past year for use by the global query engine 206. In such cases, the service platform 101 or a third party may store the queries that are received from customers.

In addition to retrieving or storing historical queries based on a selected time period, historical queries may also be retrieved or stored based on a department, subject matter, region, and the like. In other words, the query detection engine 202 can tailor the emergent query identification and prediction functionalities to a desired characteristic, such as a time period, subject matter, department, geographical location, etc.

Once the historical queries are identified and/or retrieved by the historical query module 208, the historical queries are processed via one or more preprocesses (310). In particular, the historical queries may be provided to a preprocessing module 210 in which the historical queries are processed by the one or more preprocesses. As can be appreciated, each of the queries received from customers includes textual content. Some of the textual content may relate to the incident request while other portions of the textual content may be information relating to the customer submitting the query (e.g., personal identification information) or the means with which the customer submitted the query (e.g., HTML elements, copyrights). As such, the global query engine 206, in particular the preprocessing module 210 may process each historical query to remove content that is unrelated to the query subject matter and modify the textual content into a format that can be processed by the global query engine 206.

Figure 4:
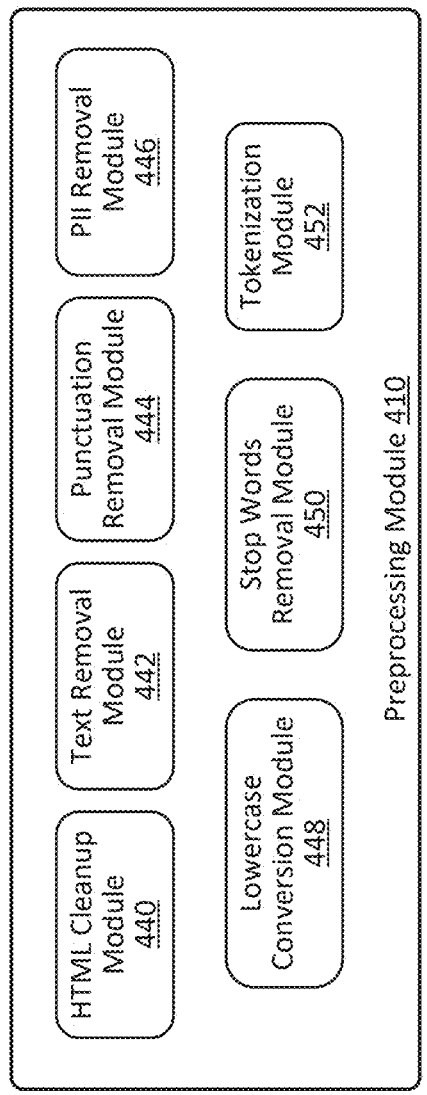
FIG. 4 illustrates an example preprocessing module, according to an embodiment herein.

As noted above, the preprocessing module 210 processes each query by one or more preprocesses. To process each query via the one or more preprocesses, the preprocessing module 210 may include various preprocesses. With reference to FIG. 4, an example preprocessing module 410 is illustrated, according to an embodiment herein. The preprocessing module 410 may be the same or similar to the preprocessing module 210 and include various preprocessing modules for processing the historical queries retrieved or identified by the query detection engine 202. For example, the preprocessing module 410 includes an HTML cleanup module 440 for performing an HTML cleanup process, a text removal module 442 for performing a text removal process, a punctuation removal module 444 for performing a punctuation removal process, a personal identification information (PII) removal module 446 for performing a PII removal process, a lowercase conversion module 448 for performing a lowercase conversion process, a stop-word removal module 450 for performing a stop-word removal process, and a tokenization module 452 for performing a tokenization process.

In an illustrative embodiment, a query is initially processed by the HTML cleanup module 440 to remove HTML elements from the content of the query. Then, the query is processed by the text removal module 442 to remove text unrelated to the query subject matter. Such unrelated text may be any copyrights, disclaimers, notes, or signatures that are present in the query. Next, the query may then be processed by the punctuation removal module 444 to remove punctuation within the query. Following that, the query may be processed by the PII removal module 446 to remove any PII, such as email address, phone number, URL, or any other personal identification information that is present within the query. The query may then be converted to lower case via the lowercase conversion module 448 and then provided to the stop-word removal module 450 to remove any stop-words (e.g., the, a, an, in, on, at, and, but). Once the query is "cleaned" such that the textual content only contains information related to the subject matter of the query and in a format ready for further processes, the query may then be tokenized by the tokenization module 452.

As can be appreciated, a query may be processed by one or more of the modules 440-452, depending on the content within the query and the desired textual content of the query after processing. Additionally, it should be appreciated that one or more of these preprocesses may be performed simultaneously or in tandem to each other and may be perform in any sequence, not limited to the above sequence of processing. Once processed by one or more of the modules 440-452, the query, also referred to as a processed query, may be stored by the preprocessing module 410 or 210. In some cases, the processed query may be stored by the query detection engine 202, by the service platform 101, or by a third party.

After the historical queries are processed by the preprocessing module 210, the queries may be submitted to an embedding module 212. The embedding module 212 generates embeddings based on each of the historical queries (315). As those skilled in the art readily appreciate, generating an embedding involves transforming textual or symbolic data, here the textual content of each query, into a numerical representation in a continuous vector space. This process captures semantic relationships and contextual information, enabling computational models to comprehend and compare the meaning of words or phrases for various natural language processing tasks.

Figure 5:
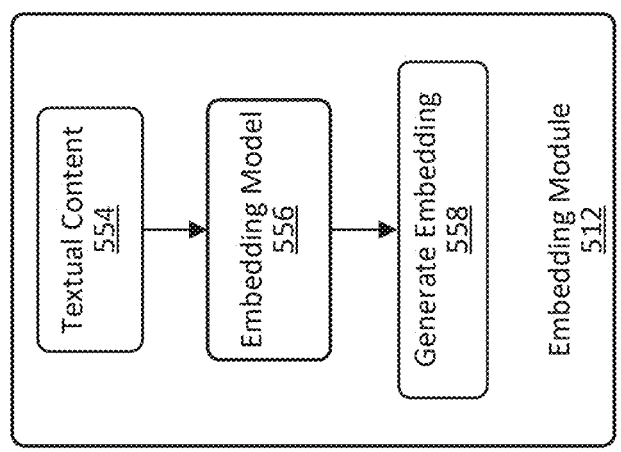
FIG. 5 illustrates an example embedding module, according to an embodiment herein.

Referring now to FIG. 5, an example embedding module 512 is illustrated, according to an embodiment herein. The embedding module 512 may be the same or similar to the embedding module 212. For example, the embedding module 512 may receive queries after they are processed by the preprocessing module 210 or 410. As such, the embedding module 512 may identify the textual content 554 of each query and generate an embedding 558 based on the textual content 554. For example, the embedding module 512 may include an embedding model 556. The embedding model 556 may be an artificial intelligence (AI) embedding model that includes a computational framework to convert the discrete data of the textual content 554 into a floating-point value or a vector representation of the textual content 554. As noted above, generating embeddings for the historical queries captures semantic relationships and contextual nuances within the textual content 554 of each historical query with respect to the other historical queries. In other words, by generating embeddings 558 for each of the historical queries, the embedding module 512 allows for discernment of similarities, dissimilarities, and relationships between the underlying textual content 554 of each historical query.

After embeddings 558 are generated for each of the queries within the group historical queries, the global query engine 206 may group the embeddings 558 into clusters (320) and generate a cluster topic for cluster (325). To cluster the embeddings 558 and generate or identify a cluster topic for each cluster, the global query engine 206 may include a clustering module 214. The clustering module 214 may include a cluster engine 216 and a cluster identification module 218.

Figure 6A:
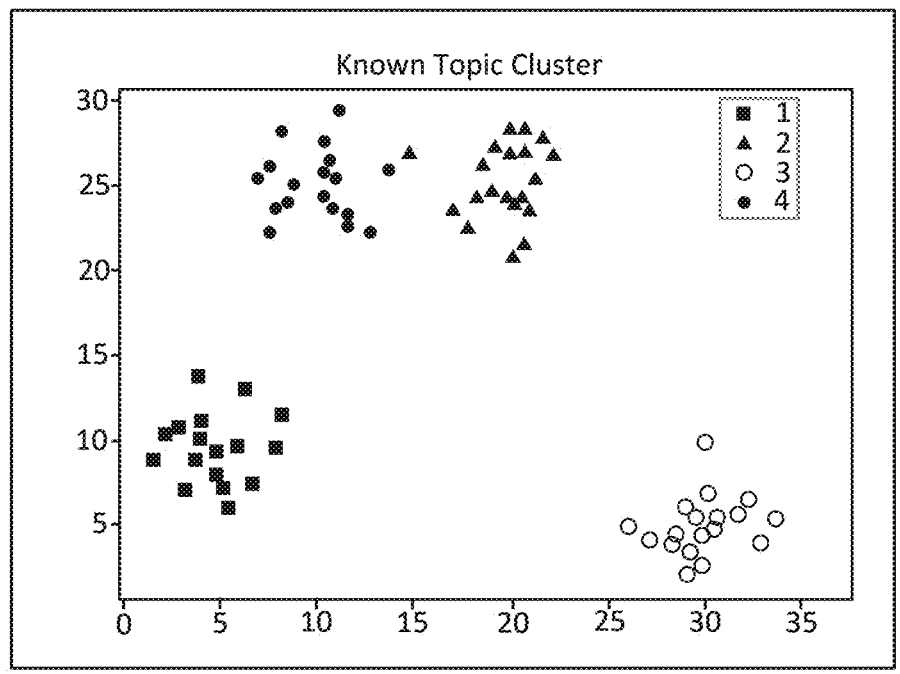
FIGS. 6A and 6B illustrate an example representation of clusters generated by a cluster engine and an example representation of cluster topics generated for each cluster, respectively, according to an embodiment herein.

The cluster engine 216 may first group the embeddings 558 into clusters. To group the embeddings 558 into clusters, the cluster engine 216 may include a clustering algorithm or model, such as a Hierarchical Density-Based Spatial Clustering of Applications with Noise (HDBSCAN) model. Since each embedding 558 is a numerical representation of the incident request within each of the historical queries, the cluster engine 216 clusters embeddings 558 having similar numerical representations together. Referring now to FIG. 6A, an example representation 600A of clusters generated by the cluster engine 216 is provided, according to an embodiment herein. As illustrated, the representation 600A includes four clusters of the embeddings 558, each cluster containing a subset of the embeddings 558. Each datapoint on the representation 600A corresponds to an embedding generated for a query received by the query detection engine 202. As such, each cluster on the representation 600A corresponds to a subset of the historical queries retrieved or stored by the query detection engine 202.

Once the clusters are generated by the cluster engine 216, the cluster module 214 may generate a cluster topic for each of the clusters. To generate the cluster topic for each cluster, the textual content 554 corresponding to the queries within a single cluster is passed to the cluster identification module 218. The cluster identification module 218 may be or include a bigram generator that generates bigrams for the textual content 554 of the queries within a given cluster.

Figure 7:
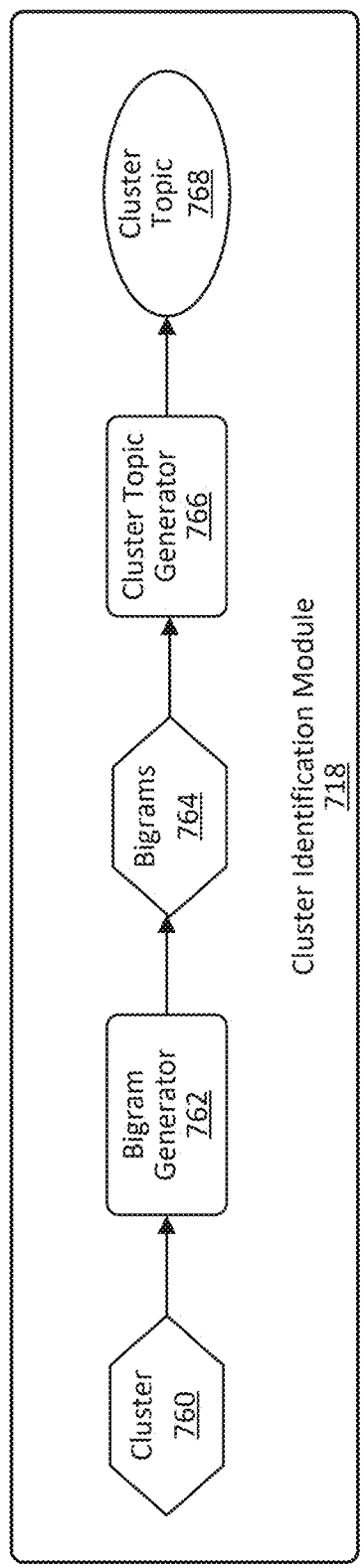
FIG. 7 illustrates an example cluster identification module, according to an embodiment herein.

Referring now to FIG. 7, an example cluster identification module 718 is illustrated, according to an embodiment herein. The cluster identification module 718 may be the same or similar to the cluster identification module 218 that is part of the query detection engine 202. For example, textual content 554 corresponding to queries clustered into a respective cluster 760 by the cluster engine 216 may be provided to the cluster identification module 718. The textual content 554 corresponding to the queries within the cluster 760 may be processed by a bigram generator 762. The bigram generator 762 generates a bigram 764 for each query within the cluster 760 based on the query's textual content 554. As those skilled in the art readily appreciate, a bigram refers to a pair of consecutive words or items within a given text, here the textual content 554. By generating bigrams 764 for each of the queries within a given cluster, the cluster identification module 718 can determine patterns and relationships arising out of sequential occurrence of elements within each of the queries. In an embodiment, the bigram generator 762 generates a collection of bigrams 764 that each include a noun. For example, the bigram generator 762 may generate a collection of "verb+noun," "adverb+noun," and "adjective+noun."

Once the bigrams 764 for the cluster 760 are generated, the bigrams 764 are provided to a cluster topic generator 766. The cluster topic generator 766 may be or include a large language model (LLM), examples of which include generative pre-trained transformer (GPT) models or multi-modal generative models. In another example, the cluster topic generator 766 may be or include a Latent Dirichlet Allocation (LDA) model. A LDA model is a probabilistic generative model employed in natural language processing to discover latent topics within a collection of documents, assigning probabilistic distributions of words to these topics.

The bigrams 764 may be received by the cluster topic generator 766 as part of a prompt requesting that the cluster topic generator 766 generate a cluster topic 768 for the cluster 760 based on the bigrams 764. In some cases, the prompt may also direct the cluster topic generator 766 to generate a cluster topic 768 that is a desired length. For example, if the bigrams 764 include "delayed deliveries," "incorrect orders," and "poor communication," then the cluster topic generator 766 may generate the cluster topic 768 as "resolving delayed deliveries" for the cluster 760.

In some cases, the bigrams 764 are cross checked by the cluster identification module 718 against bigrams generated for other clusters. In particular, the bigrams 764 are cross checked to identify common bigrams to avoid generating common cluster topics or the same cluster topic for multiple clusters. As can be appreciated, this may be performed prior to providing the bigrams 764 to the cluster topic generator 766. In some cases, if common bigrams are identified in the bigrams 764 that are the same or similar to bigrams in other clusters, then the cluster identification module 718 may remove the common bigrams from the bigrams 764 prior to submitting the bigrams 764 to the cluster topic generator 766. In this manner, the query detection engine 202 may generate a unique cluster topic for each cluster. Once generated, the bigrams 764 for each cluster may be stored by the cluster identification module 218 or 718, by the query detection engine 202, the service platform 101, or by a third party.

Figure 6B:
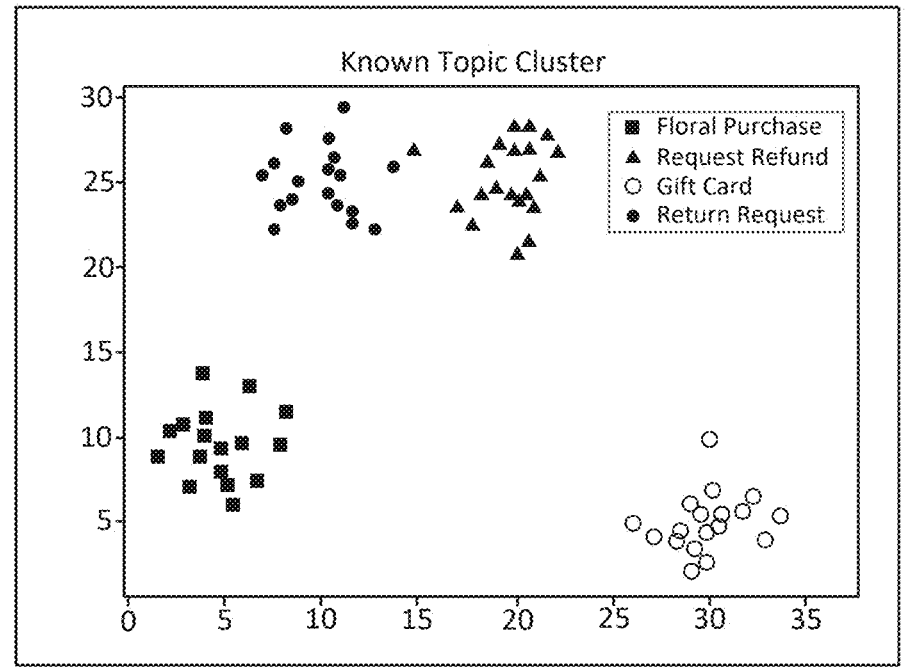

With reference to FIG. 6B, an example cluster representation 600B is illustrated in which corresponding cluster topics are provided, according to an embodiment herein. As shown by representation 600B, each cluster in the representation 600B is associated with a cluster topic that is generated by the cluster topic generator 766.

Returning now to FIG. 2, at some point the query detection engine 202 receives a new query 204 (330). The new query 204 may be received by the global query engine 206. Upon receipt of the new query 204, the global query engine 206 maps the new query 204 to the existing clusters (335). For example, the global query engine 206 may map the new query 204 to the clusters illustrated in FIG. 6A. To map the new query 204, the new query 204 may first be processed by the preprocessing module 210 and a new embedding corresponding to the new query 204 generated by the embedding module 212. The new embedding may then be mapped by the cluster engine 216 to see the relational similarity of the new embedding to the existing clusters.

The query detection engine 202 generates a confidence score 220 based on the mapping of the new query 204 (via the new embedding) to the existing clusters (340). For example, the query detection engine 202 may include a prediction model that generates the confidence score 220 based on the "closeness" or relationship of the new embedding to the embeddings of an existing cluster. Since an embedding is a numerical representation in a continuous vector space of the textual content 554 of a query, the "closeness" of the new embedding to embeddings within an existing cluster may indicate the relational similarity of the new query 204 to queries corresponding to the existing cluster. In other words, the confidence score 220 is a numerical measure indicating the level of certainty or reliability that the new embedding relates to the embeddings of an existing cluster.

Based on the confidence score 220, the query detection engine 202 determines whether or not the new query 204 relates to an existing cluster topic. For example, the confidence score 220 may be compared to a confidence threshold. The confidence threshold may be a predetermined numerical value or percentage that serves as criterion for the query detection engine 202 accepting or rejecting the validity that the new embedding is related to the embeddings of the existing cluster. As can be appreciated, confidence scores 220 that exceed the confidence threshold may be considered reliable or confident, while confidence scores 220 that fall below the confidence threshold may be deemed less certain. In an example, the confidence threshold may be at least 60%, at least 70%, or at least 80% confident that the new query corresponds to the existing cluster.

If the confidence score 220 for the new query 204 is above the confidence threshold 222, then the query detection engine 202 may provide the new query 204 to the cluster identification module 224. At the cluster identification module 224, the new query 204 may be associated with the cluster topic 768 of a respective existing cluster that the new query 204 mapped to. As such, the new embedding and the respective textual content 554 of the new query 204 may be added to the underlying dataset of that respective cluster. In other words, the new query 204 is grouped into the existing cluster and the existing cluster is updated based on the textual content 554 of the new query 204. In some cases, this may include generating bigrams 764 for the new query 204 and updating the cluster topic 768 of the existing cluster based on the bigrams 764 for the new query 204. In this manner, the clusters generated by the query detection engine 202 are dynamic and evolve as the query landscape changes over time.

If the query detection engine 202 determines that the confidence score 220 for the new query 204 falls below the confidence threshold 226, then the query detection engine 202 may assign the new query 204 as an unidentified query. As such, the new query 204 may be transmitted to the unidentified query engine 228. At the unidentified query engine 228, the new query 204 may be grouped with other unidentified queries at an unidentified query module 230. As used herein, an unidentified query may refer to queries that do not map to or are not related to identified or existing cluster topics. As such, the cluster topic for these queries is unidentified.

The unidentified query module 230 may monitor a number of unidentified queries assigned to the unidentified query engine 228. Once a threshold number of unidentified queries is reached, the unidentified query engine 228 may perform a cluster operation, similar to that performed by the global query engine 206. For example, once 30, 40, 50, or even 100 unidentified queries are assigned to the unidentified query module 230, the unidentified query engine 228 may provide the unidentified queries to the clustering module 214.

As illustrated, the clustering module 214 in the unidentified query engine 228 may be the same as the clustering module 214 in the global query engine 206. As such, the cluster engine 216 may generate clusters based on the unidentified queries from the unidentified query module 230, as described above. Once the clusters are generated, the cluster identification module 218 may generate cluster topics for each of the clusters, as discussed above. Then, a cluster counter module 232 may count the number of unidentified queries within each cluster to determine if there are any clusters containing numerous unidentified queries. If a cluster is generated containing numerous unidentified queries, then this may indicate that numerous queries are being received from customers relating to a similar incident or issue. As can be appreciated, the cluster counter module 232 may compare the number of unidentified queries within a given cluster generated by the unidentified query engine 228 to a threshold number. For example, a threshold number may be 5, 10, or 15 unidentified queries. Thus, if a cluster contains more than 5, more than 10, or more than 15 unidentified queries then the unidentified query engine 228 may identify the unidentified queries associated with that cluster as emergent queries.

Figure 8A:
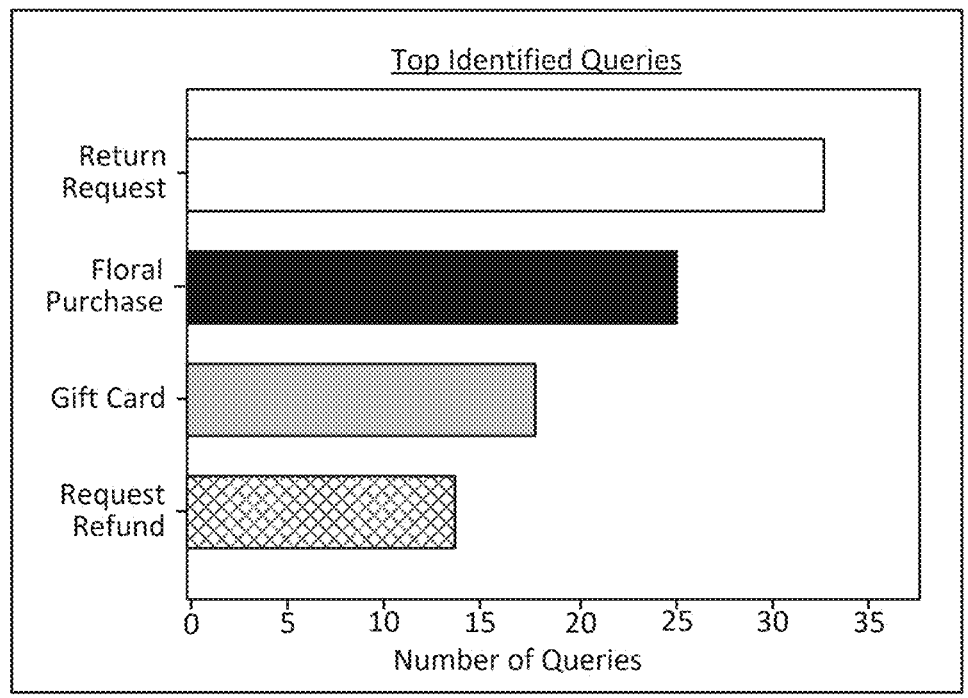
FIGS. 8A and 8B illustrate a graph of identified queries and a graph of emergent queries, respectively, according to an embodiment herein.
Figure 8B:
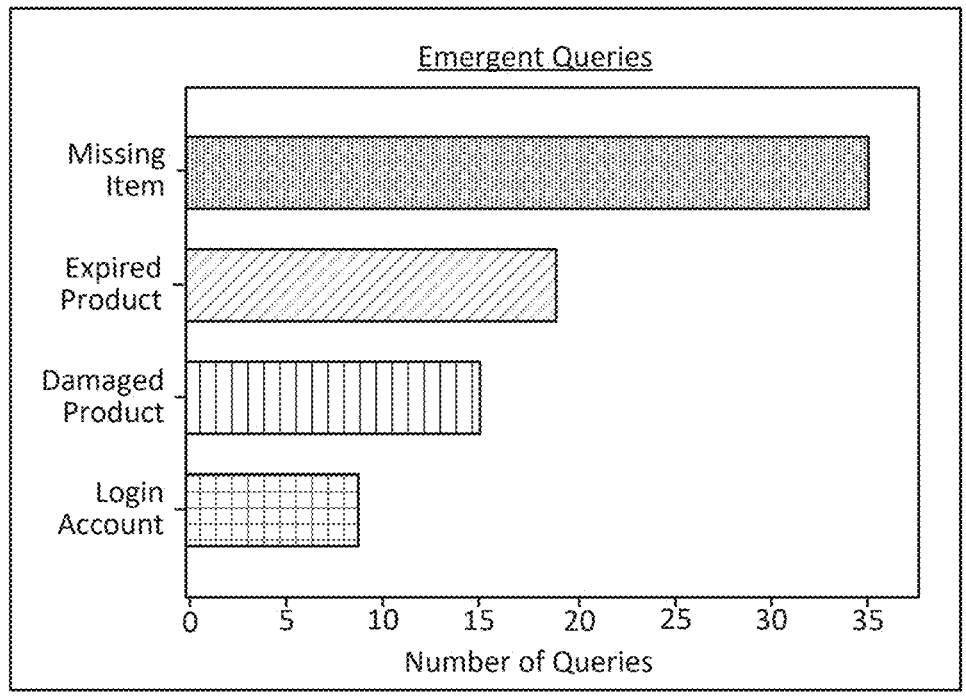

Referring now to FIG. 8A and FIG. 8B, a graph 800A of identified queries and a graph 800B of rising or emergent queries, respectively, identified by the query detection engine 202, are provided, according to an embodiment herein. The graph 800A illustrates the top existing cluster topics that are identified by the query detection engine 202. On the other hand, the graph 800B illustrates clusters of unidentified queries generated by the query detection engine 202. As illustrated, the top four cluster topics for the unidentified queries include "missing item," "expired product," "damaged product," and "login account." Since none of these cluster topics relate to the existing cluster topics of graph 800A, the query detection engine 202 did not group the unidentified queries to the existing clusters depicted in graph 800A. However, as shown by graph 800B, queries relating to "missing item" are increasing in volume, thereby indicating that queries relating to this cluster topic are emergent or currently rising.

When the unidentified query engine 228 determines that unidentified queries, that for example include the new query 204, are cluster together beyond a threshold number, the unidentified query engine 228 may determine that these unidentified queries are emergent queries (345). In other words, if the new query 204 is grouped into a cluster that includes numerous other unidentified queries, then the new query 204 may be determined to be an emergent query. In some cases, instead of the new query 204 itself being determined to be an emergent query, the corresponding cluster topic may be determined to be an emergent query topic.

In some cases, once an emergent query or emergent query topic is identified, the query detection engine 202 may generate an alert 234 to notify service agents of the rising or emergent query. As can be appreciated, this may alert service agents that there is an emergent and ongoing issue and allow service agents to allocate resources and time appropriately.

Once the unidentified queries are determined to be emergent queries, the query detection engine 202 may determine that these queries are "identified" and as such, remove them from the unidentified query engine 228. Since the emergent queries are now "identified" in that they are determined to correspond to an identified cluster topic, the emergent queries are added 236 to the historical query module 208. Once added to the historical query module 208, the emergent queries are added to the global query engine 206 pipeline such that any subsequent clusters generated by the cluster query engine 206 include the emergent queries. In this manner, the clusters generated by the global query engine 206 change with time, depending on the queries received by the query detection engine 202 during a selected time period.

As received queries relating to a respective cluster topic begin to wane or decrease (e.g., fading queries), these fading queries may no longer form clusters. Once fading queries are no longer able to be grouped to an identified cluster topic, then the global query engine 206 may assign these fading queries as unidentified queries. Eventually, as fading queries relating to a certain cluster topic are no longer being received by the query detection engine 202, these fading queries may be purged from the query detection engine 202 or no longer be present within a selected time period for which clusters are generated.

As can be appreciated, one or more components of the query detection engine 202 may be remotely hosted and executed. For example, in some embodiments, one or more of the components of the global query engine 206 may be hosted and executed by the service platform 101 or by a third party. In another embodiment, one or more components of the unidentified query engine 228 may be hosted and executed by the service platform 101 or a third party.

Figure 9:
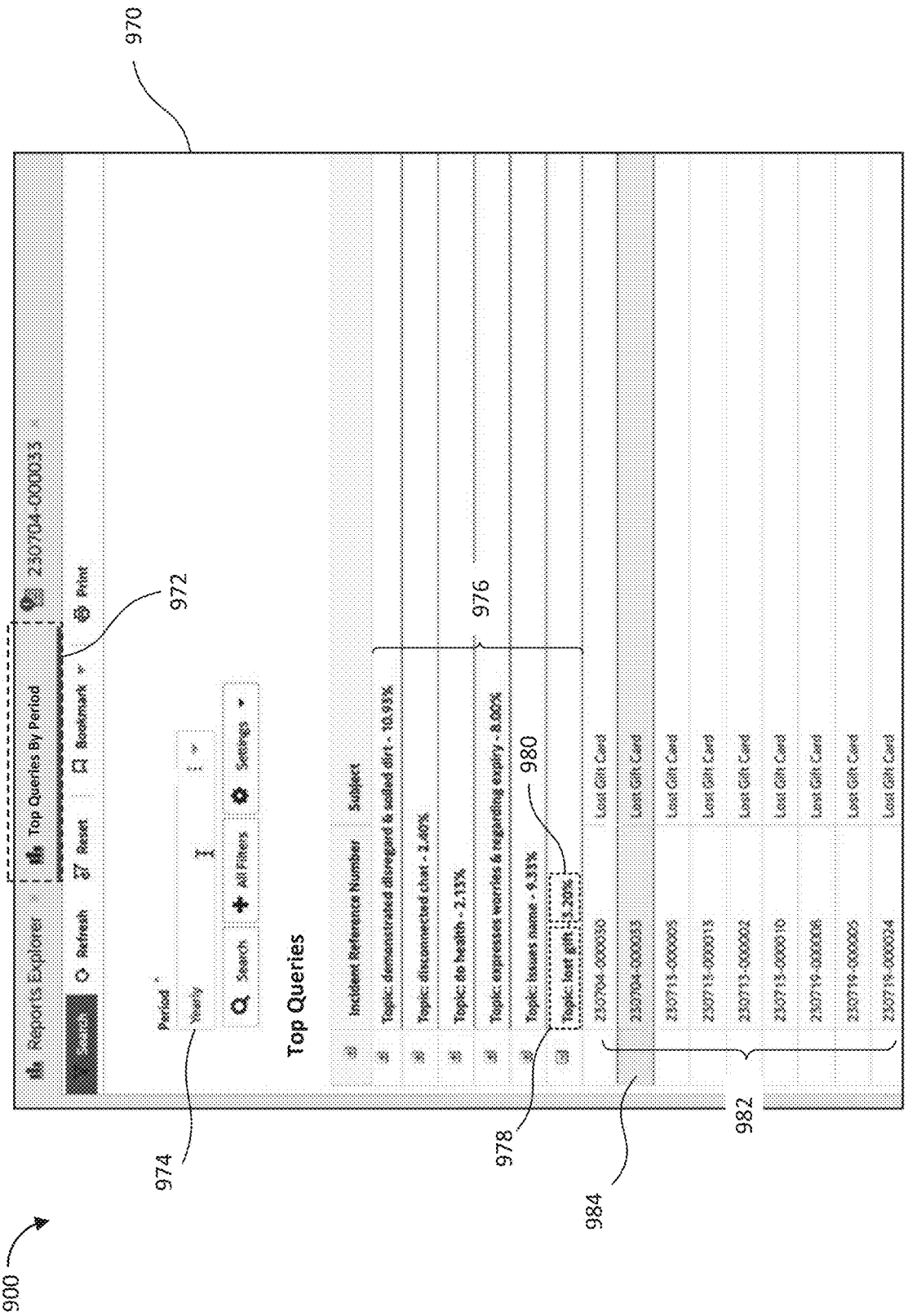
FIG. 9 illustrates an example graphical user interface (GUI) illustrating a top queries feed, according to an embodiment herein.

Turning now to FIG. 9, a graphical user interface (GUI) 900 illustrating an example top queries feed 970 is provided, according to an embodiment herein. The GUI 900 may be provided to a service agent, for example via the client device 109. The service agent may select a tab 972 and be provided with the top queries feed 970. The top queries feed 970 may allow the service agent the ability to view the cluster topics for queries based on a selected time period 974. As shown, the service agent may be able to set the selected time period 974 as desired. The selected time period 974 may be a yearly period, a monthly period, a weekly period, or any other time period desired.

Based on the selected time period 974, the query detection engine 202 may perform the query detection process described above with reference to FIGS. 2 and 3, and determine the top cluster topics 976. For each of the top cluster topics 976, the top queries feed 970 may include a respective cluster topic 978 and a percentage 980. The percentage 980 may indicate the percentage of queries within the selected time period 974 that relate to the respective cluster topic 978. In some embodiments, the service agent may also be provided with a visual representation of the top cluster topics on the top queries feed 970. For example, the top queries feed 970 may include a visual representation similar to the graph 800A.

If the service agent desired to learn more about the individual queries within the respective cluster topic 978, then the service agent can select the respective cluster topic 978 and be provided with queries 982 for that cluster topic 978. To investigate or learn more about a specific query within the queries 982, the service agent can select a desired query 984 and be provided with more information.

Figure 10:
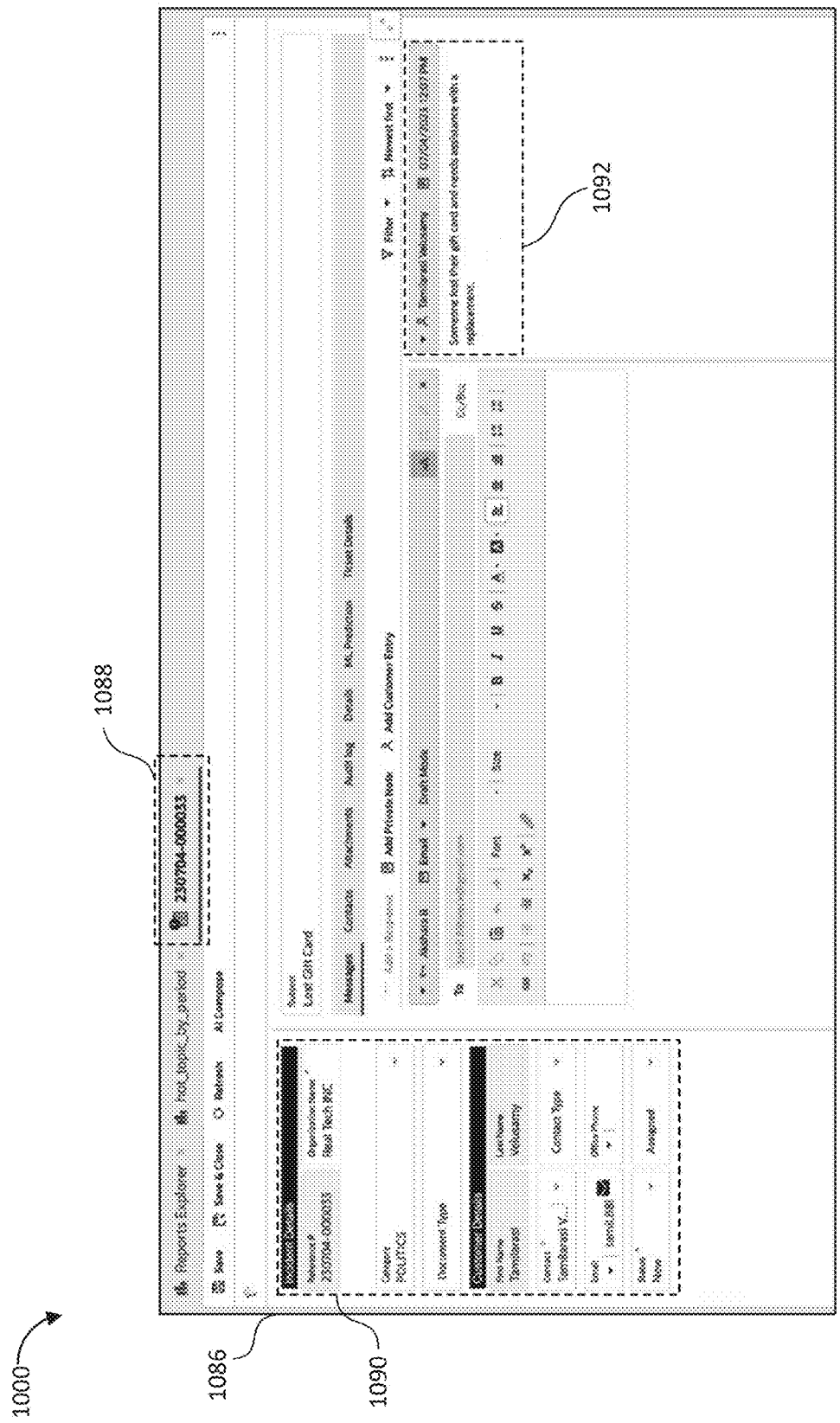
FIG. 10 illustrates an example GUI illustrating an incident query feed, according to an embodiment herein.

Referring now to FIG. 10, an example GUI 1000 illustrating an incident query feed 1086 is provided, according to an embodiment herein. The incident query feed 1086 may be provided to the service agent by selection of the desired query 984 from the top queries feed 970. As shown, the incident query feed 1086 may open in a separate tab 1088 thereby allowing the service agent to navigate between the incident query feed 1086 and the top queries feed 970.

The incident query feed 1086 provides various information relating to the incident query. For example, the incident query feed 1086 includes incident details 1090 which provide information such as the customer who submitted the query, whether or not the query has been assigned to a service agent, an organization name, a reference number, and a category to which the query relates. As can be appreciated, various other information may be included in the incident details 1090. The incident query feed 1086 also includes a note 1092 that may be generated by the service agent or another agent who assisted the customer with this query. For example, another service agent may have spoken with the customer regarding this query and generated the note 1092 for reference.

Figure 11:
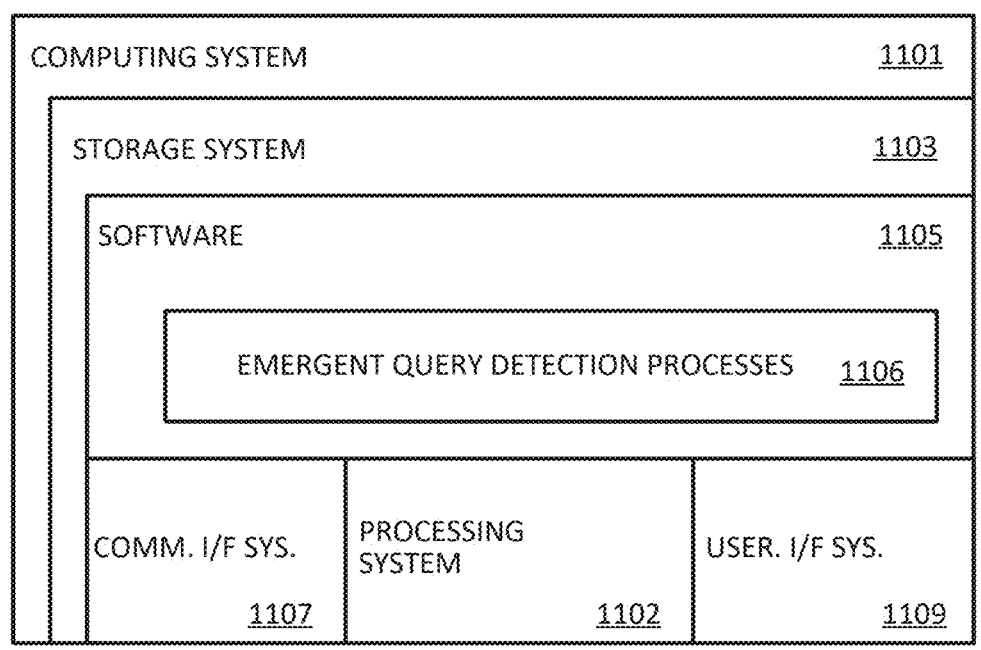
FIG. 11 shows an example computing device suitable for providing a query detection engine and its related functions, according to an embodiment herein.

Referring now to FIG. 11, is a diagram of a system 1100 configured to implement a query detection engine, according to an embodiment herein. The system 1100 may be an example of an apparatus including a computing system 1101 that is representative of any system or collection of systems in which the various processes, systems, programs, services, and scenarios disclosed herein may be implemented. For example, computing system 1101 may be an example query detection engine, such as the query detection engine 102, a service platform, such as the service platform 101, or any of the subcomponents depicted in system 100 of FIG. 1. Examples of computing system 1101 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 1101 may be implemented as a single apparatus, system, or device or may be implemented in a distributed manner as multiple apparatuses, systems, or devices. Computing system 1101 may include, but is not limited to, processing system 1102, storage system 1103, software 1105, communication interface system 1107, and user interface system 1109. Processing system 1102 may be operatively coupled with storage system 1103, communication interface system 1107, and user interface system 1109.

Processing system 1102 may load and execute software 1105 from storage system 1103. Software 1105 may include interfacing handling process 1106, which may be representative of any of the operations for providing a query detection engine or any of its related functions, as discussed with respect to the preceding figures. When executed by processing system 1102, software 1105 may direct processing system 1102 to operate as described herein for at least the various processes, such as the process 300, operational scenarios, and sequences discussed in the foregoing implementations. Computing system 1101 may optionally include additional devices, features, or functionality not discussed for purposes of brevity.

In some embodiments, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 may include general purpose central processing units, graphical processing units, application specific processors, and logic devices, as well as any other type of processing device, combinations, or variations thereof.

Storage system 1103 may comprise any memory device or computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including interface handling process 1106 among other functions) may be implemented in program instructions that may, when executed by processing system 1102, direct processing system 1102 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a query detection engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; and one or more processors communicatively coupled to the non-transitory computer-readable medium and configured to execute processor-executable instructions stored in the non-transitory computer-readable medium to: receive, by a query detection engine, a plurality of queries; process, by the query detection engine, each of the plurality of queries to generate a plurality of processed queries; generate, by the query detection engine, a plurality of embeddings based on the plurality of processed queries, wherein each of the plurality of embeddings corresponds to a respective processed query of the plurality of processed queries; group, by a cluster engine of the query detection engine, the plurality of embeddings into a plurality of clusters, wherein each of the plurality of clusters comprises a subset of processed queries from the plurality of processed queries; generate, by the query detection engine, a cluster topic for each cluster of the plurality of clusters; receive, by the query detection engine, a first query; map, by the query detection engine, the first query to a first cluster of the plurality of clusters; generate, by the query detection engine, a confidence score for the first query based on mapping the first query to the first cluster; determine, by the query detection engine, that the first query is a first emergent query based on the confidence score; and generate, by the query detection engine, an alert of the first emergent query.

Example 2 is the system of any previous or subsequent Example, wherein the processor-executable instructions to process, by the query detection engine, each of the plurality of queries to generate the plurality of processed queries cause the one or more processors to further execute processor-executable instructions stored in the non-transitory computer-readable medium to: submit, by the query detection engine, each of the plurality of queries to a preprocessing module, wherein each of the plurality of queries comprises textual content; and process, by the preprocessing module, the textual content of a respective query by one or more of: an HTML cleanup process; a text removal process; a punctuation removal process; a personal identification information (PII) process; a lowercase conversion process; a stopword removal process; or a tokenization process.

Example 3 is the system of any previous or subsequent Example, wherein: the plurality of clusters comprises a first cluster, the first cluster comprising a first subset of processed queries; and the processor-executable instructions to generate, by the query detection engine, the cluster topic for each cluster of the plurality of clusters cause the one or more processors to further execute processor-executable instructions stored in the non-transitory computer-readable medium to: generate, by the query detection engine, a plurality of bigrams for the first subset of processed queries; and generate, by the query detection engine, a first cluster topic based on the plurality of bigrams for the first subset of processed queries, wherein the first cluster topic is the cluster topic for the first cluster.

Example 4 is the system of any previous or subsequent Example, wherein the cluster engine comprises a HBD-SCAN model.

Example 5 is the system of any previous or subsequent Example, wherein the processor-executable instructions cause the one or more processors to further execute processor-executable instructions stored in the non-transitory computer-readable medium to: receive, by the query detection engine, a second query; map, by the query detection engine, the second query to a second cluster of the plurality of clusters; generate, by the query detection engine, a second confidence score for the second query based on mapping the second query to the second cluster; and determine, by the query detection engine, that the second query corresponds to a cluster topic of the second cluster based on the second confidence score.

Example 6 is the system of any previous or subsequent Example, wherein: each of the plurality of processed queries comprises textual content; and the processor-executable instructions to generate, by the query detection engine, the plurality of embeddings based on the plurality of processed queries cause the one or more processors to further execute processor-executable instructions stored in the non-transitory computer-readable medium to: process, by an embedding model, the textual content of each of the plurality of processed queries; and generate, from the embedding model, a floating-point value for the textual content of each of the plurality of processed queries, wherein an embedding for a respective processed query comprises the floating-point value.

Example 7 is the system of any previous or subsequent Example, wherein the processor-executable instructions to determine, by the query detection engine, that the first query is a first emergent query by the confidence score cause the one or more processors to further execute processor-executable instructions stored in the non-transitory computer-readable medium to: responsive to the confidence score assign, by the query detection engine, the first query into an unidentified queries group, wherein the unidentified queries group comprises a plurality of unidentified queries; generate, by the query detection engine, a second plurality of embeddings based the unidentified queries, wherein each of the second plurality of embeddings corresponds to a respective unidentified query of the plurality of unidentified queries; group, by a second cluster engine of the query detection engine, the second plurality of embeddings into a second plurality of clusters, wherein each of the second plurality of clusters comprises a subset of unidentified queries from the plurality of unidentified queries; generate, by the query detection engine, a first emergent cluster topic for each cluster of the second plurality of clusters; and determine, by the query detection engine, that the first query is the first emergent query based on the second plurality of clusters.

Example 8 is a method comprising: receiving, by a query detection engine, a plurality of queries; processing, by the query detection engine, each of the plurality of queries to generate a plurality of processed queries; generating, by the query detection engine, a plurality of embeddings based on the plurality of processed queries, wherein each of the plurality of embeddings corresponds to a respective processed query of the plurality of processed queries; grouping, by a cluster engine of the query detection engine, the plurality of embeddings into a plurality of clusters, wherein each of the plurality of clusters comprises a subset of processed queries from the plurality of processed queries; generating, by the query detection engine, a cluster topic for each cluster of the plurality of clusters; receiving, by the query detection engine, a first query; mapping, by the query detection engine, the first query to a first cluster of the plurality of clusters; generating, by the query detection engine, a confidence score for the first query based on mapping the first query to the first cluster; determining, by the query detection engine, that the first query is a first emergent query based on the confidence score; and generating, by the query detection engine, an alert of the first emergent query.

Example 9 is the method of any previous or subsequent Example, wherein generating a cluster topic for each of the plurality of clusters further comprises: generating a bigram for each processed query within the subset of processed queries of each of the plurality of clusters, wherein one or more bigrams are generated for a respective subset of processed queries; and generating a respective cluster topic for each of the plurality of clusters based on the one or more bigrams generated for the respective subset of processed queries.

Example 10 is the method of any previous or subsequent Example, the method further comprising: generating, by the query detection engine, a visual representation of emergent queries over a selected time period, wherein the emergent queries comprise the first emergent query.

Example 11 is the method of any previous or subsequent Example, wherein: generating, by the query detection engine, the confidence score for the first query based on mapping the first query to the first cluster comprises: determining, by a prediction model, the confidence score for the first query mapped to the first cluster; and determining, by the query detection engine, that the first query is a first emergent query based on the confidence score comprises: comparing, by the prediction model, the confidence score to a confidence threshold; and determining, by the prediction model, that the confidence score is less than or equal to the confidence threshold; and determining, by the prediction model, that the first query is the first emergent query based on the confidence score being less than or equal to the confidence threshold.

Example 12 is the method of any previous or subsequent Example, wherein the cluster topic generated for each of the plurality of clusters is a unique cluster topic for each cluster within the plurality of clusters.

Example 13 is the method of any previous or subsequent Example, wherein determining, by the query detection engine, that the first query is a first emergent query based on the confidence score further comprises: responsive to the confidence score for the first query, assigning the first query to an unidentified query group, wherein the unidentified query group comprises a plurality of unidentified queries; determining, by the query detection engine, that the plurality of unidentified queries comprises a threshold number of unidentified queries; generating, by the query detection engine, a second plurality of embeddings based the unidentified queries, wherein each of the second plurality of embeddings corresponds to a respective unidentified query of the plurality of unidentified queries; grouping, by a second cluster engine of the query detection engine, the second plurality of embeddings into a second plurality of clusters, wherein each of the second plurality of clusters comprises a subset of unidentified queries from the plurality of unidentified queries; generating, by the query detection engine, a first emergent cluster topic for each cluster of the second plurality of clusters; and determining, by the query detection engine, that the first query is the first emergent query based on the second plurality of clusters.

Example 14 is the method of any previous or subsequent Example, wherein the plurality of queries comprise historical queries received over a selected time period.

Example 15 is a non-transitory computer-readable medium comprising processor-executable instructions configured to cause one or more processors to: receive, by a query detection engine, a plurality of queries; process, by the query detection engine, each of the plurality of queries to generate a plurality of processed queries; generate, by the query detection engine, a plurality of embeddings based on the plurality of processed queries, wherein each of the plurality of embeddings corresponds to a respective processed query of the plurality of processed queries; group, by a cluster engine of the query detection engine, the plurality of embeddings into a plurality of clusters, wherein each of the plurality of clusters comprises a subset of processed queries from the plurality of processed queries; generate, by the query detection engine, a cluster topic for each cluster of the plurality of clusters; receive, by the query detection engine, a first query; map, by the query detection engine, the first query to a first cluster of the plurality of clusters; generate, by the query detection engine, a confidence score for the first query based on mapping the first query to the first cluster; determine, by the query detection engine, that the first query is a first emergent query based on the confidence score; and generate, by the query detection engine, an alert of the first emergent query.

Example 16 is the non-transitory computer-readable medium of any previous or subsequent Example, wherein the processor-executable instructions to generate the cluster topic for each of the plurality of clusters further cause the one or more processors to further execute processor-executable instructions stored in the non-transitory computer-readable medium to: generate a bigram for each processed query within the subset of processed queries of each of the plurality of clusters, wherein one or more bigrams are generated for a respective subset of processed queries; and generate a respective cluster topic for each of the plurality of clusters based on the one or more bigrams generated for the respective subset of processed queries.

Example 17 is the non-transitory computer-readable medium of any previous or subsequent Example, wherein the processor-executable instructions to process, by the query detection engine, each of the plurality of queries to generate the plurality of processed queries further cause the one or more processors to further execute processor-executable instructions stored in the non-transitory computer-readable medium to: process, by a preprocessing module of the query detection engine, textual content of a respective query by one or more of: an HTML cleanup process; a text removal process; a punctuation removal process; a personal identification information (PII) process; a lowercase conversion process; a stop-word removal process; or a tokenization process.

Example 18 is the non-transitory computer-readable medium of any previous or subsequent Example, wherein the processor-executable instructions stored in the non-transitory computer-readable medium are further configured to cause the one or more processors to: prior to mapping the first query to the first cluster of the plurality of clusters, preprocessing, by the query detection engine, the first query by one or more of: an HTML cleanup process; a text removal process; a punctuation removal process; a personal identification information (PII) process; a lowercase conversion process; a stop-word removal process; or a tokenization process.

Example 19 is the non-transitory computer-readable medium of any previous or subsequent Example, wherein the processor-executable instructions to determine, by the query detection engine, that the first query is a first emergent query by the confidence score further cause the one or more processors to: assign, by the query detection engine, the first query into an unidentified queries group, wherein the unidentified queries group comprises a plurality of unidentified queries; generate, by the query detection engine, a second plurality of embeddings based the unidentified queries, wherein each of the second plurality of embeddings corresponds to a respective unidentified query of the plurality of unidentified queries; group, by a second cluster engine of the query detection engine, the second plurality of embeddings into a second plurality of clusters, wherein each of the second plurality of clusters comprises a subset of unidentified queries from the plurality of unidentified queries; generate, by the query detection engine, a first emergent cluster topic for each cluster of the second plurality of clusters; and determine, by the query detection engine, that the first query is the first emergent query based on the second plurality of clusters.

Example 20 is the non-transitory computer-readable medium of any previous or subsequent Example, wherein the processor-executable instructions stored in the non-transitory computer-readable medium are further configured to cause the one or more processors to: receive, by the query detection engine, a second query; map, by the query detection engine, the second query to a second cluster of the plurality of clusters; generate, by the query detection engine, a second confidence score for the second query based on mapping the second query to the second cluster; and determine, by the query detection engine, that the second query corresponds to a cluster topic of the second cluster based on the second confidence score.

What is claimed is:

1. A system comprising:
a non-transitory computer-readable medium; and
one or more processors communicatively coupled to the non-transitory computer-readable medium and configured to execute processor-executable instructions stored in the non-transitory computer-readable medium to:
receive, by a query detection engine, a plurality of queries from a plurality of client devices over a period of time, wherein each query of the plurality of queries is a request for assistance with issues related to goods or services;
process, by the query detection engine, each of the plurality of queries to generate a plurality of processed queries;
generate, by the query detection engine, a plurality of embeddings based on the plurality of processed queries, wherein each of the plurality of embeddings corresponds to a respective processed query of the plurality of processed queries;
group, by a cluster engine of the query detection engine, the plurality of embeddings into a plurality of clusters in real-time as queries are received from the plurality of client devices, wherein each of the plurality of clusters comprises a subset of processed queries from the plurality of processed queries;
generate, by the query detection engine, a cluster topic for each cluster of the plurality of clusters;
receive, by the query detection engine, a first query from a first client device at a first time within the period of time;
map, by the query detection engine, the first query to a first cluster of the plurality of clusters;
generate, by the query detection engine, a confidence score for the first query based on mapping the first query to the first cluster;
determine, by the query detection engine, that the first query is a first emergent query based on the confidence score; and
generate, by the query detection engine, an alert of the first emergent query.

2. The system of claim 1, wherein the processor-executable instructions to process, by the query detection engine, each of the plurality of queries to generate the plurality of processed queries cause the one or more processors to further execute processor-executable instructions stored in the non-transitory computer-readable medium to:
submit, by the query detection engine, each of the plurality of queries to a preprocessing module, wherein each of the plurality of queries comprises textual content; and
process, by the preprocessing module, the textual content of a respective query by one or more of:
an HTML cleanup process;
a text removal process;
a punctuation removal process;
a personal identification information (PII) process;
a lowercase conversion process;
a stop-word removal process; or
a tokenization process.

3. The system of claim 1, wherein:
the plurality of clusters comprises a first cluster, the first cluster comprising a first subset of processed queries; and
the processor-executable instructions to generate, by the query detection engine, the cluster topic for each cluster of the plurality of clusters cause the one or more processors to further execute processor-executable instructions stored in the non-transitory computer-readable medium to:
generate, by the query detection engine, a plurality of bigrams for the first subset of processed queries; and
generate, by the query detection engine, a first cluster topic based on the plurality of bigrams for the first subset of processed queries, wherein the first cluster topic is the cluster topic for the first cluster.

4. The system of claim 1, wherein the cluster engine comprises a HBDSCAN model.

5. The system of claim 1, wherein the processor-executable instructions cause the one or more processors to further execute processor-executable instructions stored in the non-transitory computer-readable medium to:
receive, by the query detection engine, a second query at a second time within the period of time;
map, by the query detection engine, the second query to a second cluster of the plurality of clusters;
generate, by the query detection engine, a second confidence score for the second query based on mapping the second query to the second cluster; and
determine, by the query detection engine, that the second query corresponds to a cluster topic of the second cluster based on the second confidence score.

6. The system of claim 1, wherein:
each of the plurality of processed queries comprises textual content; and
the processor-executable instructions to generate, by the query detection engine, the plurality of embeddings based on the plurality of processed queries cause the one or more processors to further execute processor-executable instructions stored in the non-transitory computer-readable medium to:
process, by an embedding model, the textual content of each of the plurality of processed queries; and
generate, from the embedding model, a floating-point value for the textual content of each of the plurality of processed queries, wherein an embedding for a respective processed query comprises the floating-point value.

7. The system of claim 1, wherein the processor-executable instructions to determine, by the query detection engine, that the first query is a first emergent query by the confidence score cause the one or more processors to further execute processor-executable instructions stored in the non-transitory computer-readable medium to:
responsive to the confidence score assign, by the query detection engine, the first query into an unidentified queries group, wherein the unidentified queries group comprises a plurality of unidentified queries;
generate, by the query detection engine, a second plurality of embeddings based on the unidentified queries, wherein each of the second plurality of embeddings corresponds to a respective unidentified query of the plurality of unidentified queries;
group, by a second cluster engine of the query detection engine, the second plurality of embeddings into a second plurality of clusters, wherein each of the second plurality of clusters comprises a subset of unidentified queries from the plurality of unidentified queries;
generate, by the query detection engine, a first emergent cluster topic for each cluster of the second plurality of clusters; and
determine, by the query detection engine, that the first query is the first emergent query based on the second plurality of clusters.

8. A method comprising:
receiving, by a query detection engine, a plurality of queries from a plurality of client devices over a period of time, wherein each query of the plurality of queries is a request for assistance with issues related to goods or services;
processing, by the query detection engine, each of the plurality of queries to generate a plurality of processed queries;
generating, by the query detection engine, a plurality of embeddings based on the plurality of processed queries, wherein each of the plurality of embeddings corresponds to a respective processed query of the plurality of processed queries;
grouping, by a cluster engine of the query detection engine, the plurality of embeddings into a plurality of clusters in real-time as queries are received from the plurality of client devices, wherein each of the plurality of clusters comprises a subset of processed queries from the plurality of processed queries;
generating, by the query detection engine, a cluster topic for each cluster of the plurality of clusters;
receiving, by the query detection engine, a first query from a first client device at a first time within the period of time;
mapping, by the query detection engine, the first query to a first cluster of the plurality of clusters;
generating, by the query detection engine, a confidence score for the first query based on mapping the first query to the first cluster;
determining, by the query detection engine, that the first query is a first emergent query based on the confidence score; and
generating, by the query detection engine, an alert of the first emergent query.

9. The method of claim 8, wherein generating a cluster topic for each of the plurality of clusters further comprises:
generating a bigram for each processed query within the subset of processed queries of each of the plurality of clusters, wherein one or more bigrams are generated for a respective subset of processed queries; and
generating a respective cluster topic for each of the plurality of clusters based on the one or more bigrams generated for the respective subset of processed queries.

10. The method of claim 8, the method further comprising:
generating, by the query detection engine, a visual representation of emergent queries over a selected time period, wherein the emergent queries comprise the first emergent query.

11. The method of claim 8, wherein:
generating, by the query detection engine, the confidence score for the first query based on mapping the first query to the first cluster comprises:
determining, by a prediction model, the confidence score for the first query mapped to the first cluster; and
determining, by the query detection engine, that the first query is a first emergent query based on the confidence score comprises:
comparing, by the prediction model, the confidence score to a confidence threshold; and
determining, by the prediction model, that the confidence score is less than or equal to the confidence threshold; and
determining, by the prediction model, that the first query is the first emergent query based on the confidence score being less than or equal to the confidence threshold.

12. The method of claim 8, wherein the cluster topic generated for each of the plurality of clusters is a unique cluster topic for each cluster within the plurality of clusters.

13. The method of claim 8, wherein determining, by the query detection engine, that the first query is a first emergent query based on the confidence score further comprises:

responsive to the confidence score for the first query, assigning the first query to an unidentified query group, wherein the unidentified query group comprises a plurality of unidentified queries;

determining, by the query detection engine, that the plurality of unidentified queries comprises a threshold number of unidentified queries;

generating, by the query detection engine, a second plurality of embeddings based on the unidentified queries, wherein each of the second plurality of embeddings corresponds to a respective unidentified query of the plurality of unidentified queries;

grouping, by a second cluster engine of the query detection engine, the second plurality of embeddings into a second plurality of clusters, wherein each of the second plurality of clusters comprises a subset of unidentified queries from the plurality of unidentified queries;

generating, by the query detection engine, a first emergent cluster topic for each cluster of the second plurality of clusters; and determining, by the query detection engine, that the first query is the first emergent query based on the second plurality of clusters.

14. The method of claim 8, wherein the plurality of queries comprises historical queries received over a selected time period within the period of time.

15. A non-transitory computer-readable medium comprising processor-executable instructions configured to cause one or more processors to:

receive, by a query detection engine, a plurality of queries from a plurality of client devices over a period of time, wherein each query of the plurality of queries is a request for assistance with issues related to goods or services;

process, by the query detection engine, each of the plurality of queries to generate a plurality of processed queries;

generate, by the query detection engine, a plurality of embeddings based on the plurality of processed queries, wherein each of the plurality of embeddings corresponds to a respective processed query of the plurality of processed queries;

group, by a cluster engine of the query detection engine, the plurality of embeddings into a plurality of clusters in real-time as queries are received from the plurality of client devices, wherein each of the plurality of clusters comprises a subset of processed queries from the plurality of processed queries;

generate, by the query detection engine, a cluster topic for each cluster of the plurality of clusters;

receive, by the query detection engine, a first query from a first client device at a first time within the period of time;

map, by the query detection engine, the first query to a first cluster of the plurality of clusters;

generate, by the query detection engine, a confidence score for the first query based on mapping the first query to the first cluster;

determine, by the query detection engine, that the first query is a first emergent query based on the confidence score; and generate, by the query detection engine, an alert of the first emergent query.

16. The non-transitory computer-readable medium of claim 15, wherein the processor-executable instructions to generate the cluster topic for each of the plurality of clusters further cause the one or more processors to further execute processor-executable instructions stored in the non-transitory computer-readable medium to:

generate a bigram for each processed query within the subset of processed queries of each of the plurality of clusters, wherein one or more bigrams are generated for a respective subset of processed queries; and generate a respective cluster topic for each of the plurality of clusters based on the one or more bigrams generated for the respective subset of processed queries.

17. The non-transitory computer-readable medium of claim 15, wherein the processor-executable instructions to process, by the query detection engine, each of the plurality of queries to generate the plurality of processed queries further cause the one or more processors to further execute processor-executable instructions stored in the non-transitory computer-readable medium to:

process, by a preprocessing module of the query detection engine, textual content of a respective query by one or more of:
an HTML cleanup process;
a text removal process;
a punctuation removal process;
a personal identification information (PII) process;
a lowercase conversion process;
a stop-word removal process; or
a tokenization process.

18. The non-transitory computer-readable medium of claim 15, wherein the processor-executable instructions stored in the non-transitory computer-readable medium are further configured to cause the one or more processors to:

prior to mapping the first query to the first cluster of the plurality of clusters, preprocessing, by the query detection engine, the first query by one or more of:
an HTML cleanup process;
a text removal process;
a punctuation removal process;
a personal identification information (PII) process;
a lowercase conversion process;
a stop-word removal process; or
a tokenization process.

19. The non-transitory computer-readable medium of claim 15, wherein the processor-executable instructions to determine, by the query detection engine, that the first query is a first emergent query by the confidence score further cause the one or more processors to:

assign, by the query detection engine, the first query into an unidentified queries group, wherein the unidentified queries group comprises a plurality of unidentified queries;

generate, by the query detection engine, a second plurality of embeddings based on the unidentified queries, wherein each of the second plurality of embeddings corresponds to a respective unidentified query of the plurality of unidentified queries;

group, by a second cluster engine of the query detection engine, the second plurality of embeddings into a second plurality of clusters, wherein each of the second plurality of clusters comprises a subset of unidentified queries from the plurality of unidentified queries;

generate, by the query detection engine, a first emergent cluster topic for each cluster of the second plurality of clusters; and determine, by the query detection engine, that the first query is the first emergent query based on the second plurality of clusters.

20. The non-transitory computer-readable medium of claim 15, wherein the processor-executable instructions stored in the non-transitory computer-readable medium are further configured to cause the one or more processors to:
receive, by the query detection engine, a second query at a second time within the period of time;
map, by the query detection engine, the second query to a second cluster of the plurality of clusters;
generate, by the query detection engine, a second confidence score for the second query based on mapping the second query to the second cluster; and
determine, by the query detection engine, that the second query corresponds to a cluster topic of the second cluster based on the second confidence score.

* * * * *